(12) United States Patent
Ehrlich

(10) Patent No.: US 10,767,409 B2
(45) Date of Patent: Sep. 8, 2020

(54) OVERHEAD DOOR ROTATING SEAL

(71) Applicant: WABASH NATIONAL, L.P., Lafayette, IN (US)

(72) Inventor: Rodney P. Ehrlich, Monticello, IN (US)

(73) Assignee: Wabash National, L.P., Lafayette, IN (US)

( * ) Notice: Subject to any disclaimer, the term of this patent is extended or adjusted under 35 U.S.C. 154(b) by 527 days.

(21) Appl. No.: 15/715,867

(22) Filed: Sep. 26, 2017

(65) Prior Publication Data

US 2018/0094469 A1 Apr. 5, 2018

Related U.S. Application Data

(60) Provisional application No. 62/402,228, filed on Sep. 30, 2016.

(51) Int. Cl.
*B60J 10/00* (2016.01)
*B60J 10/84* (2016.01)
*E05D 15/24* (2006.01)
*E06B 7/18* (2006.01)

(52) U.S. Cl.
CPC .............. *E05D 15/24* (2013.01); *B60J 10/00* (2013.01); *B60J 10/84* (2016.02); *E05Y 2800/12* (2013.01); *E06B 7/18* (2013.01)

(58) Field of Classification Search
CPC ....... B60J 5/10; B60J 5/108; B60J 5/12; B60J 5/14; B60J 5/125; B60J 10/20; B60J 10/23; B60J 10/235; B60J 10/24; B60J 10/244; B60J 10/246; B60J 10/36; B60J 10/40; B60J 10/45; B60J 10/50; B60J 10/80; B60J 10/84; B60J 10/85; E06B 7/098; E06B 7/18; E06B 7/215; E05Y 2800/12; E05Y 2900/516; E05Y 2900/532; E05D 15/24
USPC ............ 296/186.3, 154, 155, 146.8; 49/91.1, 49/197, 320, 477.1, 484.1, 498.1; 160/133
See application file for complete search history.

(56) References Cited

U.S. PATENT DOCUMENTS

| | | | | |
|---|---|---|---|---|
| 2,837,151 | A | * 6/1958 | Stroup | .................... E06B 3/485 160/40 |
| 3,339,619 | A | * 9/1967 | Crosswell | ................ B60J 10/84 160/40 |
| 4,372,603 | A | 2/1983 | Stanczak et al. | |
| 4,643,239 | A | * 2/1987 | Wentzel | .................... B60J 10/82 160/201 |
| 4,957,301 | A | * 9/1990 | Clay, Jr. | ..................... B60J 5/14 160/40 |
| 5,141,280 | A | * 8/1992 | Gerrard | ..................... B65F 3/00 296/146.8 |
| 5,255,952 | A | 10/1993 | Ehrlich | |
| 5,435,104 | A | * 7/1995 | Dietrich | .................... B60J 5/14 49/475.1 |

(Continued)

*Primary Examiner* — Gregory A Blankenship
(74) *Attorney, Agent, or Firm* — Quarles & Brady LLP

(57) ABSTRACT

Embodiments of the invention provide a door sealing system for an overhead door assembly of a vehicle comprises a rotating seal apparatus. The overhead door assembly includes a door frame and a door panel. The rotating seal apparatus comprises a rod, a first seal, and a second seal. When the door panel is in a closed position, the rod is actuatable, so that, when actuated, the rod is rotated, compressing the seal against the door panel and compressing the second seal against the door frame.

20 Claims, 7 Drawing Sheets

(56) References Cited

U.S. PATENT DOCUMENTS

| | | | | |
|---|---|---|---|---|
| 6,098,696 | A * | 8/2000 | Styra | B21C 23/145 160/201 |
| 6,886,870 | B2 | 5/2005 | Ehrlich | |
| 8,100,465 | B2 | 1/2012 | Wylezinski | |
| 8,468,746 | B2 * | 6/2013 | Salerno | E05B 65/0021 49/199 |
| 8,528,622 | B2 | 9/2013 | Ehrlich | |
| 8,627,606 | B2 * | 1/2014 | Salerno | E06B 7/20 49/197 |
| 8,720,938 | B2 | 5/2014 | Ehrlich | |
| 9,296,280 | B2 | 3/2016 | Ehrlich | |
| 9,863,173 | B2 | 1/2018 | Ehrlich et al. | |
| 2003/0173040 | A1 * | 9/2003 | Court | E06B 3/80 160/230 |
| 2004/0140676 | A1 * | 7/2004 | Eklund | E05B 65/0021 292/97 |
| 2005/0161172 | A1 * | 7/2005 | Rekret | E06B 3/486 160/201 |
| 2006/0005472 | A1 * | 1/2006 | Miller | E06B 7/18 49/498.1 |
| 2009/0255187 | A1 * | 10/2009 | Alexander | B60J 10/244 49/477.1 |
| 2010/0308984 | A1 | 12/2010 | Ehrlich et al. | |
| 2011/0018205 | A1 * | 1/2011 | Nelson | E06B 9/582 277/315 |
| 2013/0126106 | A1 | 5/2013 | Hindman | |
| 2014/0069018 | A1 * | 3/2014 | Blackwood | B60J 10/84 49/303 |
| 2015/0068686 | A1 * | 3/2015 | Hindman | B60J 5/14 160/40 |
| 2015/0082704 | A1 * | 3/2015 | Gamble | E06B 9/582 49/306 |
| 2016/0102482 | A1 | 4/2016 | Ehrlich | |
| 2016/0145915 | A1 | 5/2016 | Ehrlich et al. | |
| 2016/0168895 | A1 | 6/2016 | Ehrlich | |
| 2018/0094469 | A1 * | 4/2018 | Ehrlich | B60J 10/00 |
| 2019/0136609 | A1 * | 5/2019 | Dintheer | E06B 3/46 |
| 2019/0168591 | A1 * | 6/2019 | Sykes | E06B 7/18 |

* cited by examiner

OVERHEAD DOOR ROTATING SEAL

CROSS REFERENCE TO RELATED APPLICATIONS

This application claims the benefit of U.S. Application Ser. No. 62/402,228, filed on Sep. 30, 2016, and entitled "Overhead Rotating Seal," the disclosure of which is incorporated herein by reference in its entirety.

BACKGROUND

In many applications, it may be useful to provide a seal to an overhead door assembly, in order to prevent air or other elements from flowing through the overhead door assembly. For example, it may be useful, in a truck trailer used to transport goods that require refrigeration, to provide a seal to the overhead door, such that the cool air within the truck trailer is contained within the truck trailer. It may also be useful, for example, in a truck trailer used to transport goods that must be kept dry, to prevent outdoor elements (i.e., rain, sleet, snow, etc.) from entering the truck trailer.

SUMMARY

Some embodiments of the invention provide a Some embodiment of the invention provide a door sealing system for an overhead door assembly of a vehicle having a brake pressure system, the overhead door assembly including a door frame having a sill and a door panel moveable between an open position and a closed position, the door sealing system comprising a rotating seal apparatus comprising a rod arranged proximate an edge of the door frame, a first seal extending radially from the rod, and a second seal extending radially from the rod, such that when the door panel is in the closed position, the rod is moveable between a first position, where the first seal is spaced-apart from the door panel and the second seal is spaced-apart from the door frame, and a second position, where the first seal is engaged with the door panel and the second seal is engaged with the door frame.

In some embodiments, the system further includes an actuation system including an actuation valve assembly connected to an actuation mechanism configured to move the rod between the first position and the second position.

In some embodiments, the actuation system is a pneumatic actuation system.

In some embodiments, the pneumatic actuation system is pneumatically powered using pressurized air from the brake pressure system of the vehicle.

In some embodiments, the system further comprises a latch assembly configured to selectively lock and unlock the door panel in the closed position and when the latch assembly locks the door panel in the closed position, the latch assembly is configured to engage the actuation valve assembly of the actuation system.

In some embodiments, when the latch assembly engages the actuation valve assembly, the actuation valve assembly is configured to actuate the actuation mechanism to move the rod into the second position.

In some embodiments, the actuation valve assembly includes an actuation plate assembly and a pneumatic valve.

In some embodiments, the actuation plate assembly is configured to selectively actuate the pneumatic valve and includes a striker.

In some embodiments, the actuation mechanism includes a cylinder and a piston rod configured to move out of and into the cylinder when the actuation mechanism is pressurized and depressurized, respectively.

In some embodiments, the latch assembly includes a curved arm configured to selectively engage and disengage the sill to respectively lock and unlock the door panel in the closed position.

In some embodiments, the rotating seal apparatus further includes an arm rigidly coupled to and extending radially outward from the rod and further coupled to an end of the piston rod of the actuation mechanism.

In some embodiments, when the curved arm engages the sill, thereby locking the door panel in the closed position, the curved arm further engages the striker of the actuation plate assembly, thereby actuating the pneumatic valve such that pressurized air from the brake pressure system is applied through the actuation valve assembly to the actuation mechanism, thus forcing the piston rod to move partially out of the actuation mechanism, thereby pushing the arm and moving the rod from the first position to the second position.

In some embodiments, the rod is rotatable between the first position and the second position.

Some embodiments of the invention provide a door sealing system for an overhead door assembly of a vehicle, the overhead door assembly including a door frame having a sill and a door panel moveable between an open position and a closed position, the vehicle having a brake pressure system, the sealing system comprising a rotating seal apparatus including a rod, a first seal, and a second seal, the rod arranged proximate an edge of the door frame, the first seal extending radially from the rod, and the second seal extending radially from the rod, an actuation system including an actuation valve assembly and an actuation mechanism, the actuation valve assembly connected to the brake pressure system, and the actuation mechanism connected to the actuation valve assembly and configured to move the rod between a first position, where the first seal is spaced-apart from the door panel and the second seal is spaced-apart from the door frame, and a second position, where the first seal is engaged with the door panel and the second seal is engaged with the door frame, and a latch assembly having a curved arm configured to selectively engage and disengage the sill to respectively lock and unlock the door panel in the closed position, wherein when the curved arm engages the sill, thereby locking the door panel in the closed position, the curved arm further engages the actuation valve assembly such that pressurized air from the brake pressure system is applied through the actuation valve assembly to the actuation mechanism, and when the pressurized air is applied to the actuation mechanism, the actuation mechanism is configured to move the rod from the first position to the second position.

In some embodiments, the actuation valve assembly includes an actuation plate assembly and a pneumatic valve.

In some embodiments, the actuation plate assembly is configured to selectively actuate the pneumatic valve and includes a striker.

In some embodiments, the actuation mechanism includes a cylinder and a piston rod configured to move out of and into the cylinder when the actuation mechanism is pressurized and depressurized, respectively.

In some embodiments, the rotating seal apparatus further includes an arm extending radially outward from the rod and coupled to an end of the piston rod of the actuation mechanism.

In some embodiments, when the curved arm engages the actuation valve assembly, the curved arm further engages the striker of the actuation plate assembly, thereby actuating the pneumatic valve such that the pressurized air from the brake pressure system is applied through the actuation valve assembly to the actuation mechanism, thus forcing the piston rod to move partially out of the actuation mechanism, thereby pushing the arm and moving the rod from the first position to the second position.

In some embodiments, the rod is rotatable between the first position and the second position.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
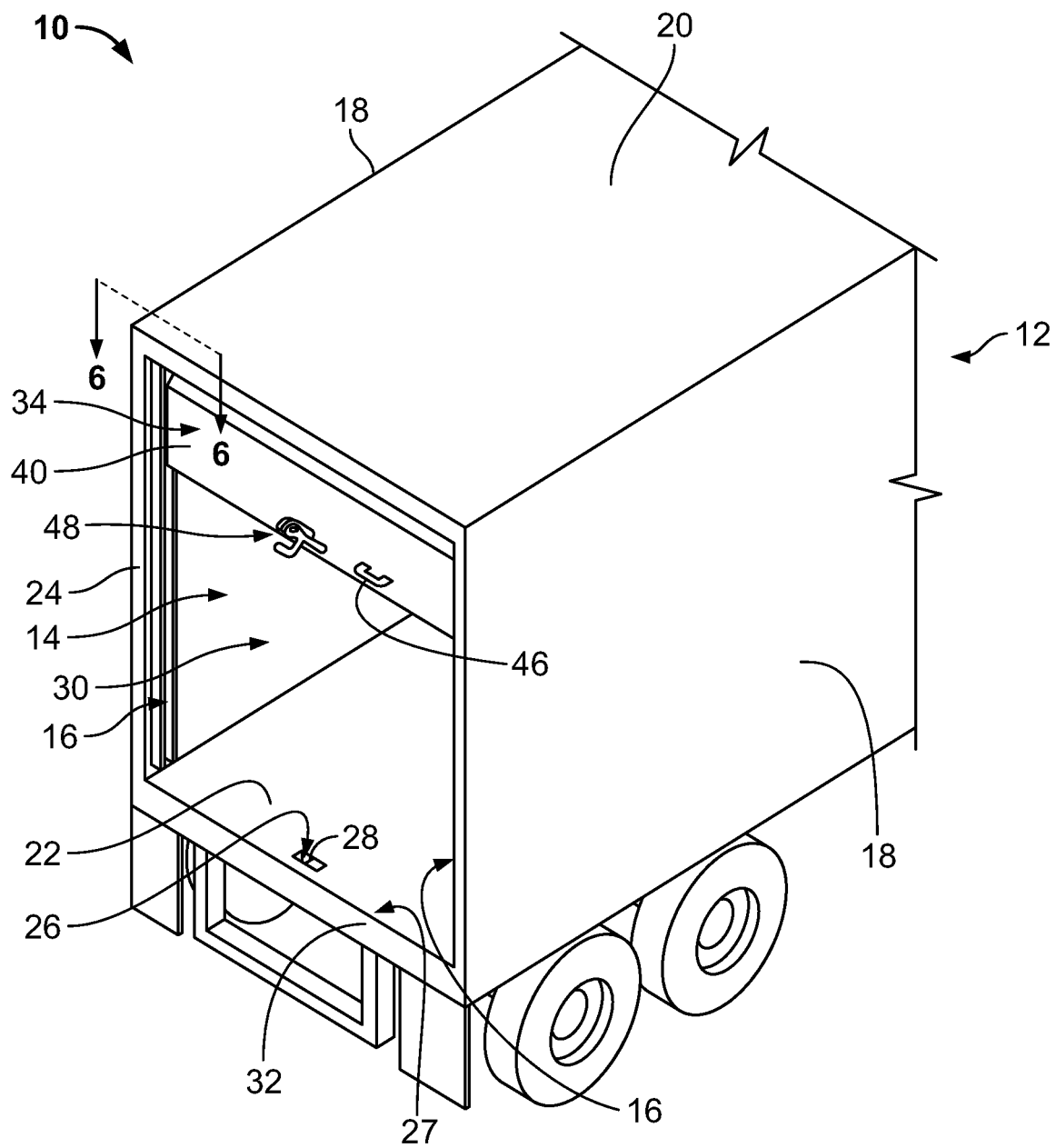
FIG. 1 is a back, left, top perspective view of a truck trailer, according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

In the discussion below, various examples describe an overhead door rotating seal assembly for use with various overhead door assemblies (e.g., dry freight door assemblies, refrigerated freight door assemblies, etc.) of truck trailers. The overhead door rotating seal assembly described is presented as an example only, and the disclosed overhead door rotating seal can be used to seal overhead door assemblies with other configurations, or to seal other surfaces generally.

As used herein, directional terms including "top," "bottom," "side," "horizontal," "vertical," and so on are used to indicate directional relationships with respect to an arbitrary reference frame (e.g., a reference frame of a particular figure or figures). These directional terms are used consistently relative to a particular embodiment. For example, a "top" feature of an embodiment is opposite a corresponding "bottom" feature, and a "horizontal" feature generally extends perpendicularly to a "vertical" feature. However, unless otherwise defined or limited, these directional terms are not intended to indicate an absolute reference frame for a particular rotating seal assembly or installation. For example, in some installations or embodiments, a "horizontal" feature of a rotating seal assembly, while generally perpendicular to a "vertical" feature of the rotating seal assembly, may not necessarily extend in a strictly horizontal direction relative to ground.

FIG. 1 illustrates a truck trailer 10 according to one embodiment of the invention. The truck trailer 10 includes a housing 12, an overhead door assembly 14, and two rotating seal assemblies 16. The housing 12 includes two side walls 18, a top wall 20, a floor 22, and a rear wall 24. The rear wall 24 includes a door opening 30 and a sill 32 disposed adjacent the rear end 27 of the floor 22. The sill 32 includes a latch aperture 26 disposed proximate a rear end 27 of the floor 22. The latch aperture 26 defines a substantially rectangular shape and includes a latch bar 28. The latch bar 28 extends between two opposing edges of the latch aperture 26 in a direction generally perpendicular to the rear wall 24.

Figure 2:
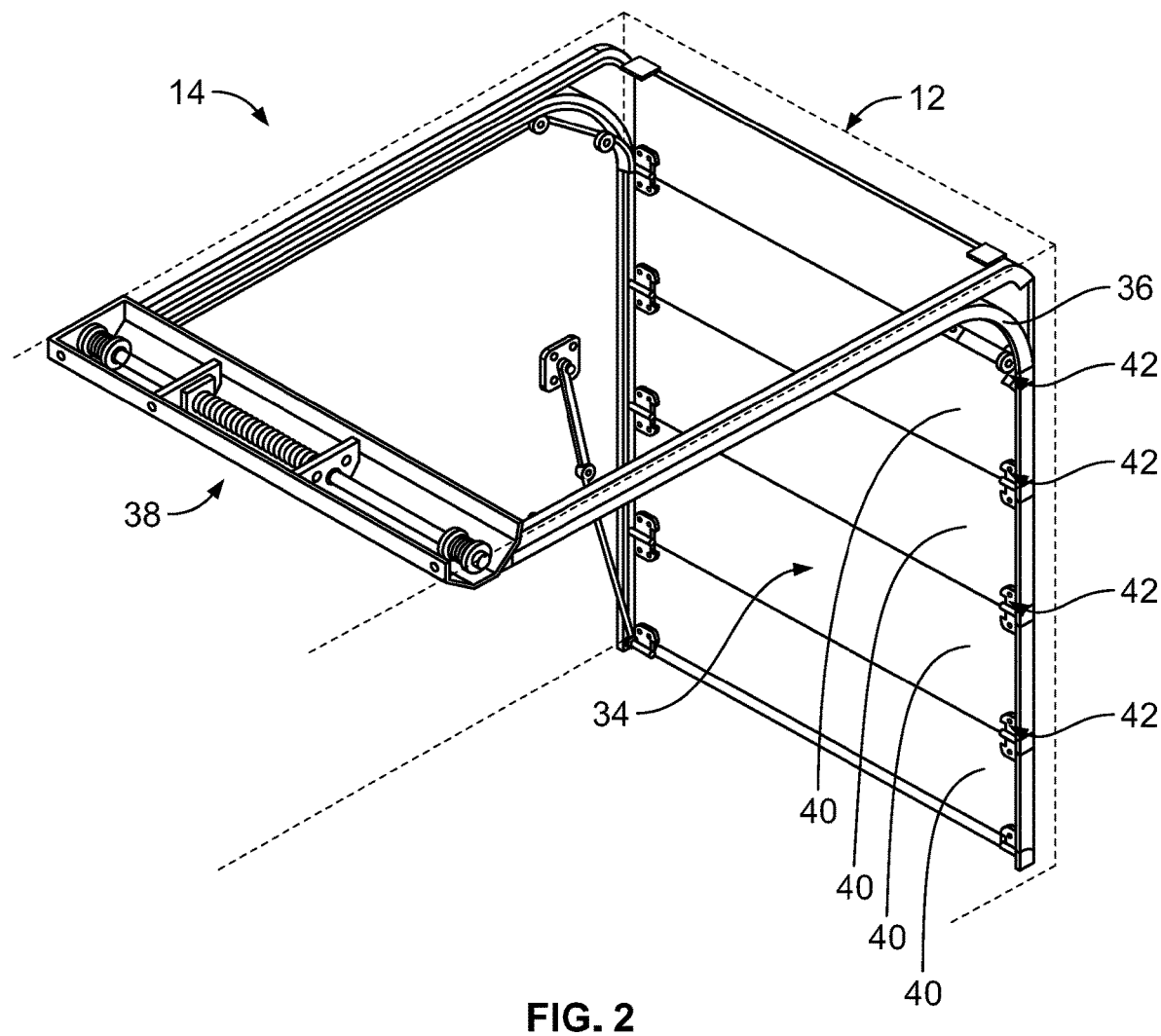
FIG. 2 is a front, right, top perspective view of an overhead door assembly, disposed within the truck trailer of FIG. 1.
Figure 3:
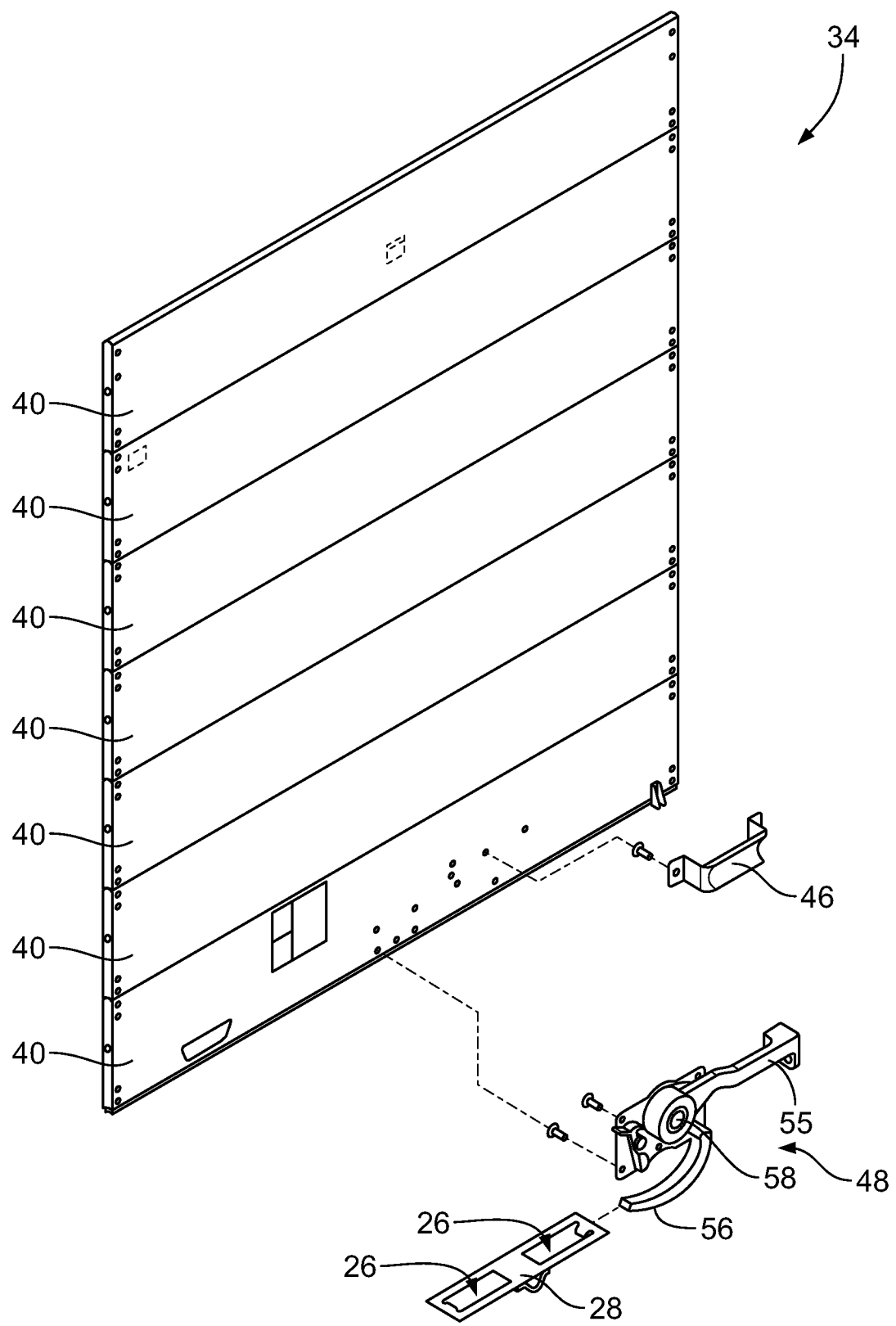
FIG. 3 is a back, right, top exploded view of a portion of the overhead door assembly of FIG. 2.

As shown in FIGS. 2 and 3, the overhead door assembly 14 includes a door 34, a roller track 36, and a lift assist mechanism 38. The door 34 includes several door panels 40 coupled together by hinges 42 disposed along opposing edges of the door 34. Each of the hinges 42 further includes a corresponding roller 44 (shown in FIGS. 6 and 7) configured to roll within the roller track 36, thereby allowing the door 34 to be moved between an open position (as illustrated in FIG. 1) and a closed position (as illustrated in FIG. 2). The lift assist mechanism 38 is configured to assist in moving the door 34 between the open and closed positions. As shown in FIG. 3, the door 34 further includes a handle 46 and a latch assembly 48 configured to latch the door 34, and thereby lock the door 34 in the closed position.

Figure 4:
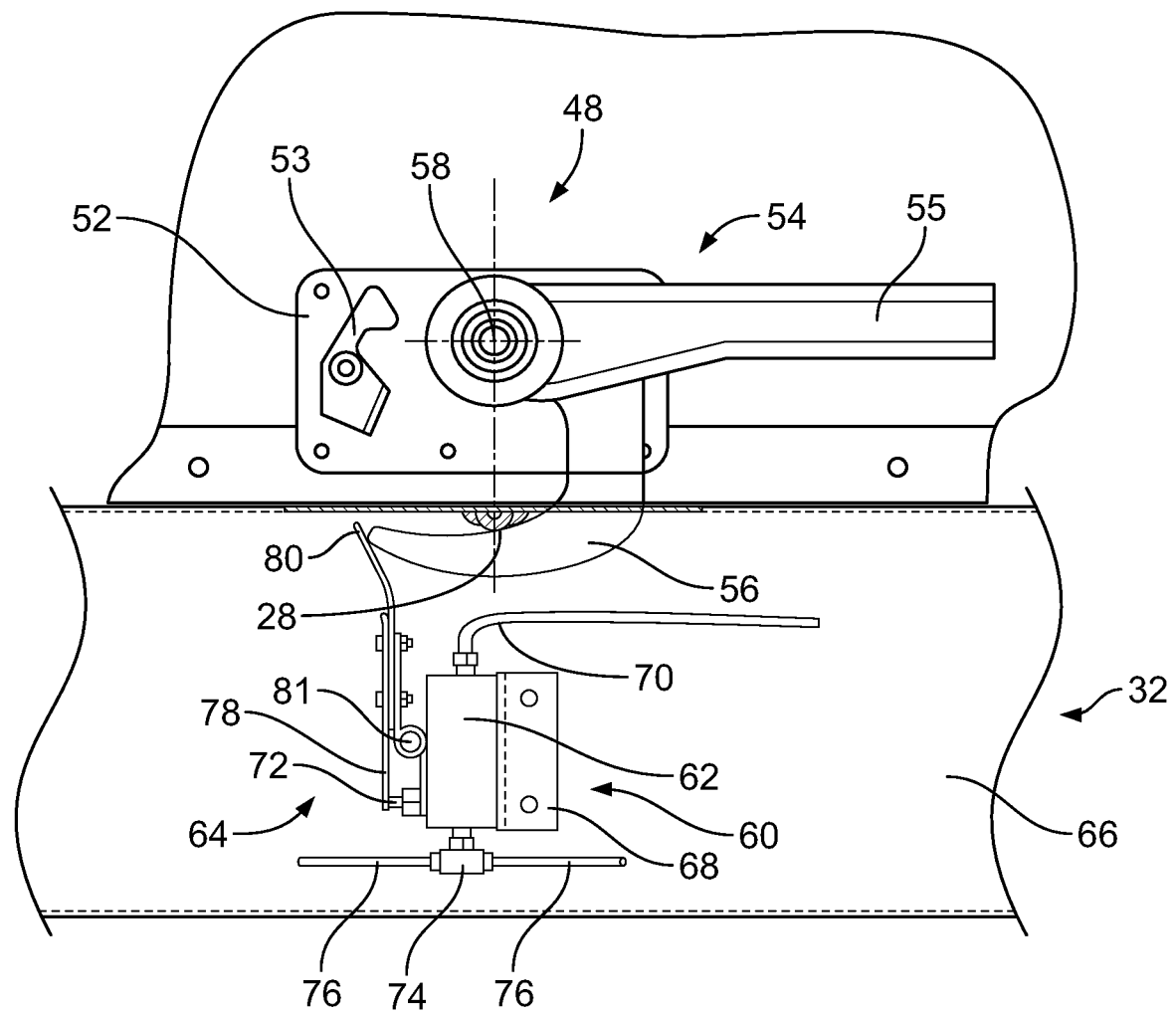
FIG. 4 is a back elevational detail view of a door handle assembly and a valve assembly disposed within a sill of the truck trailer of FIG. 1.

As shown in FIG. 4, the latch assembly 48 includes a mounting plate 52, a locking mechanism 53, and a banana latch 54 including a latch handle 55 rigidly fixed to a curved arm 56. The banana latch 54 is rotatably coupled to the mounting plate 52 by a pin-type joint 58. The curved arm 56 of the banana latch 54 is configured to engage both the latch bar 28 within the latch aperture 26 of the floor 22, and an actuation valve assembly 60. The locking mechanism 53 is configured to selectively lock the banana latch 54 in engagement with the latch bar 28.

The actuation valve assembly 60 is disposed within the sill 32 and includes a pneumatic valve 62 and an actuation plate assembly 64. The pneumatic valve 62 is mounted to an internal surface 66 of the sill 32 using a mounting angle 68 and includes an inlet line 70 coupled to a pneumatic pressure truck braking system (not shown), an actuation plunger 72, and an outlet line splitter 74 connecting to two outlet lines 76. The actuation plate assembly 64 includes a plunger striker portion 78 and a flexible striker portion 80, both coupled to a spring-biased hinge 81. The spring-biased hinge 81 is further coupled to the pneumatic valve 62. The actuation plate assembly 64 is configured so that the plunger striker portion 78 and the flexible striker portion 80 extend in opposite directions. When an end of the flexible striker portion 80 is moved in a first direction, the actuation plate assembly 64 rotates about the spring-biased hinge 81, and the plunger striker portion 78 is moved in a second direction, substantially opposite the first direction.

The spring-biased hinge 81 biases the actuation plate assembly 64 towards an initial position. In the initial position, the end of the plunger striker portion 78 is disposed proximate a tip of the actuation plunger 72 and the flexible striker portion 80 extends in a substantially vertical direction towards the latch aperture 26 of the floor 22. The flexible striker portion 80 is contacted by the curved arm 56 of the banana latch 54 when the door 34 of the truck trailer 10 is closed.

Figure 5:
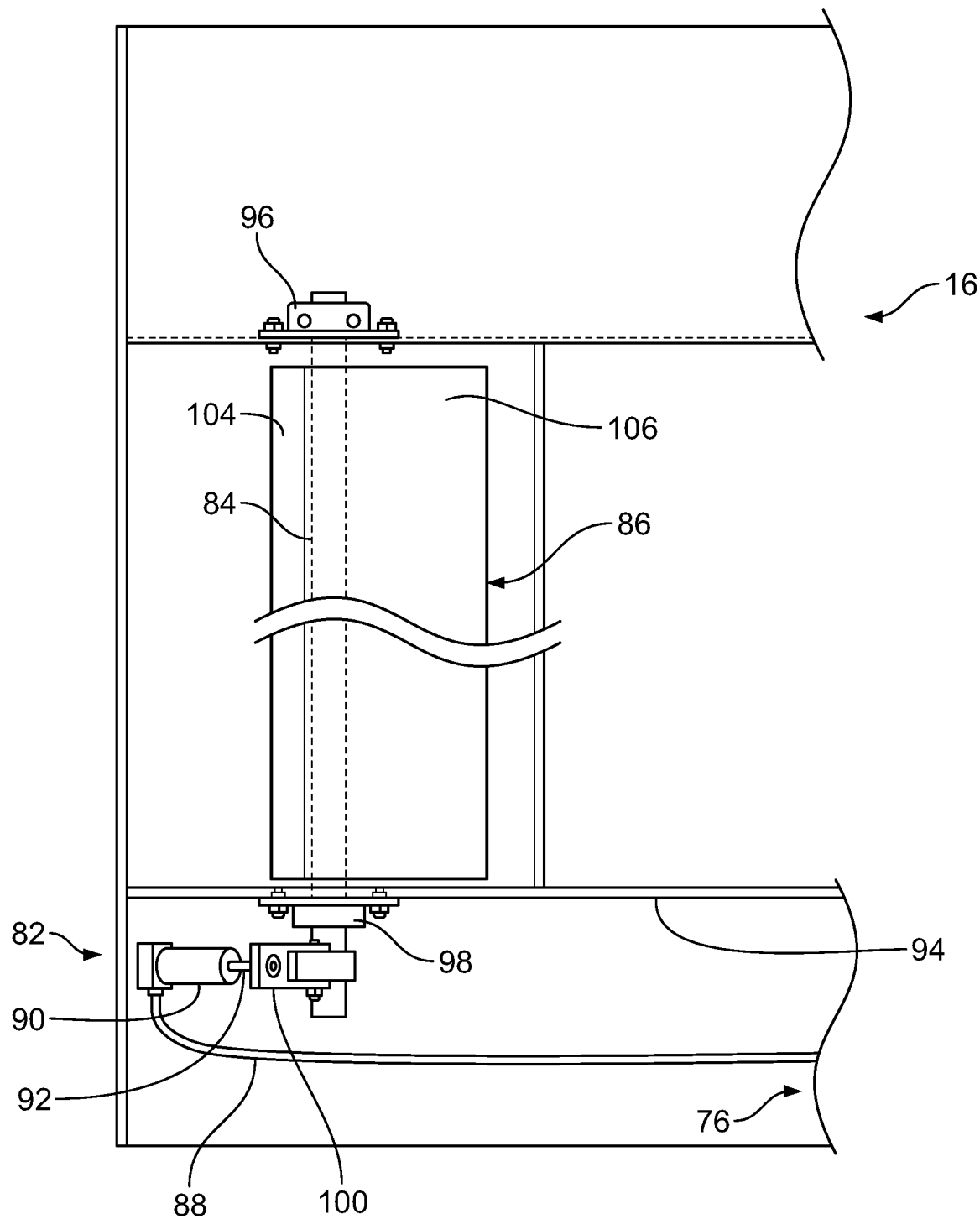
FIG. 5 is a back elevational detail view of a rotating seal assembly, disposed within the truck trailer of FIG. 1.
Figure 6:
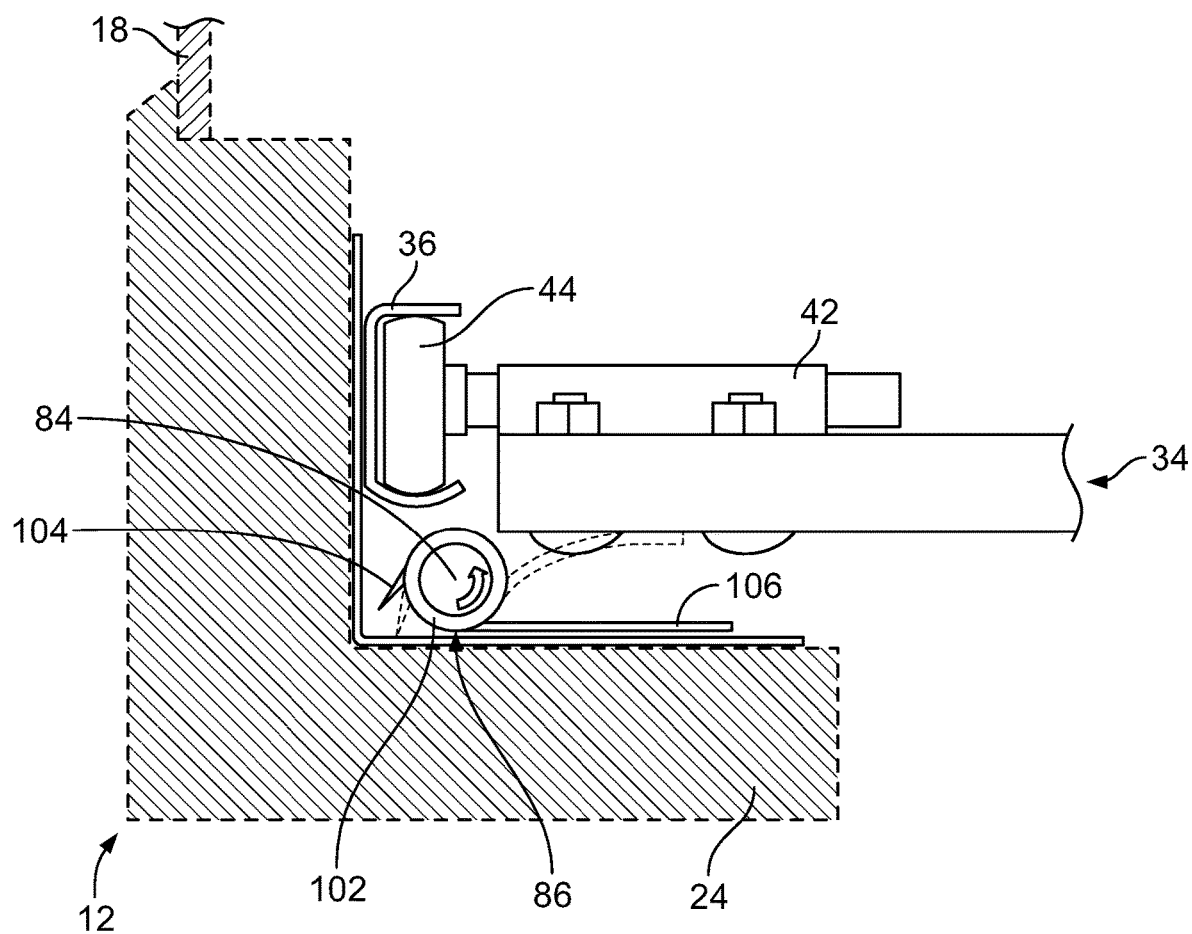
FIG. 6 is a cross-sectional view of the truck trailer of FIG. 1, taken along line 6-6.

FIGS. 5 and 6 illustrate one of the two rotating seal assemblies 16, according to one embodiment of the invention. The two rotating seal assemblies 16 are similar, but generally form mirror images of each other. The two rotating seal assemblies 16 are disposed within the truck trailer 10, at rear corners of the truck trailer 10 spanning from the floor 22 to the top wall 20. As illustrated, the rotating seal assembly 16 includes a pneumatic actuation mechanism 82, a center shaft 84, and a rotary seal 86. The pneumatic actuation mechanism 82 includes an inlet line 88 connected to one of the two outlet lines 76 of the actuation valve assembly 60, a cylinder 90, and a piston rod 92. The center shaft 84 extends from within the sill 32, through an upper interior surface 94 of the sill 32, through the interior portion of the truck trailer 10, and through the top wall 20 of the truck trailer 10. Additionally, the center shaft 84 includes a top bearing 96, coupled to the top wall 20 of the truck trailer 10, a bottom bearing 98, coupled to the upper interior surface 94 of the sill 32, and an arm 100 extending radially outward from the center shaft 84 and rigidly fixed thereto. The arm 100 is disposed within the sill 32 and is coupled to an end of the piston rod 92 of the pneumatic actuation mechanism 82. The rotary seal 86 is rigidly fixed to the center shaft 84, so that the rotary seal 86 is rotatable with the center shaft 84. As shown in FIG. 6, the rotary seal 86 includes a central cylinder portion 102, a flexible wall portion 104, and a flexible door portion 106.

The rotary seal 86 is actuatable between a non-sealing position (as shown by solid lines in FIG. 6) and a sealing position (as shown by dashed lines in FIG. 6). In the non-sealing position, the flexible wall portion 104 is disposed proximate the rear wall 24, with a slight gap therebetween. Also in the non-sealing position, the flexible door portion 106 is disposed between the rear wall 24 and the door 34, generally adjacent the rear wall 24. In the sealing position, the center shaft 84, and therefore the rotary seal 86, is rotated so that the flexible wall portion 104 of the rotary seal 86 is compressed against the rear wall 24 of the truck trailer 10 and the flexible door portion 106 of the rotary seal 86 is compressed against the door 34, thereby providing a seal between the door 34 and the rear wall 24.

Figure 7:
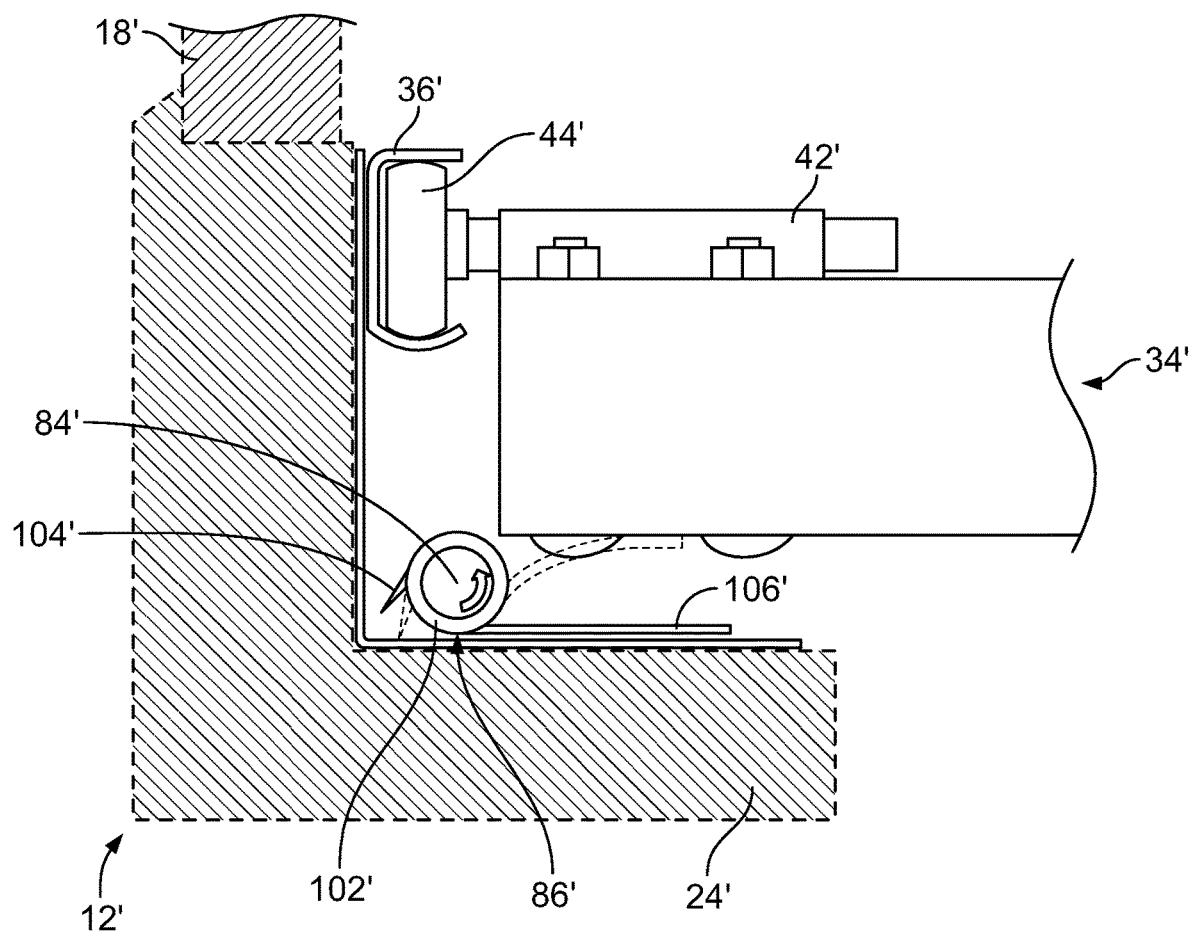
FIG. 7 is a cross-sectional view similar to the cross-sectional view of FIG. 6, but with a reefer door alternatively installed.

FIG. 7 illustrates a rotating seal assembly 16' installed into a refrigerated truck trailer 10', according to one embodiment of the invention. The rotating seal assembly 16' and the refrigerated truck trailer 10' are generally similar to the rotating seal assembly 16 and the truck trailer 10 depicted in FIGS. 1-6, with like numbers labeled similarly in the prime series (e.g., flexible wall portion 104 and flexible wall portion 104', roller track 36 and roller track 36', etc.). The door 34' of the refrigerated truck trailer 10' is considerably thicker than the door 34 of the truck trailer 10. Even so, the configuration of the rotating seal assembly 16' is still able to provide an actuatable seal between the door 34' and the rear wall 24'.

Now that the structure of the rotating seal assembly 16 has been described above, a method of producing the rotating seal assembly 16 will be described below. It will be understood that the method of producing the rotating seal assembly 16 is given only as an example. The rotating seal assembly 16 can be produced according to a variety of methods, and the following example is not meant to be limiting.

The rotary seal 86 of the rotating seal assembly 16 can be manufactured through a dual extrusion process. The dual extrusion process can allow for the central cylinder portion 102 to be made of a hard, rigid plastic material, while both the flexible wall portion 104 and the flexible door portion 106 are made of a soft, flexible plastic material.

Alternatively, the rotary seal 86 of the rotating seal assembly 16 can be manufactured with a central cylinder portion 102 that is produced separately from the flexible wall portion 104 and the flexible door portion 106. In these instances, the flexible wall portion 104 and the flexible door portion 106 can be rigidly fixed to the central cylinder portion 102 using fasteners, adhesive, or other suitable coupling methods. Similarly, in some embodiments, the rotary seal 86 may not include the central cylinder portion 102. In these instances, the flexible door portion 106 and the flexible wall portion 104 can be directly coupled to the center shaft 84 of the rotating seal assembly 16.

Now that the structure and method of manufacturing of the rotating seal assembly 16 have been described above, an exemplary method of use will be described below. Again, it will be understood that the method of use described below is given as an example, and is not meant to be limiting.

During use, the rotating seal assembly 16 is configured to be in the non-sealing position while the door 34 is open. With the rotating seal assembly 16 in the non-sealing position, the door 34 is movable between the open and closed positions, thereby allowing an operator to enter the truck trailer 10 to load and unload various freight into and out of the truck trailer 10.

Once the operator exits the truck trailer 10, the operator can close the door 34. The operator can then use the latch assembly 48 to lock the door 34 in the closed position by rotating the latch handle 55 of the banana latch 54 clockwise to a locked position. In the locked position, the curved arm 56 of the banana latch 54 extends through the latch aperture 26 in the floor 22 of the truck trailer 10, into the interior portion of the sill 32, with the curved arm 56 disposed below the latch bar 28. In this configuration, the curved arm 56 engages the latch bar 28, preventing the door 34 from being raised, and thereby locking the door 34 in the closed position.

Additionally, when the banana latch 54 is rotated into the locked position, a tip of the curved arm 56 contacts the flexible striker portion 80 of the actuation plate assembly 64 and moves the flexible striker portion 80 in the first direction. When the flexible striker portion 80 is moved in the first direction, the actuation plate assembly 64 rotates about the spring-biased hinge 81, and the plunger striker portion 78 is moved in the second direction and compresses the actuation plunger 72.

When the plunger striker portion 78 compresses the actuation plunger 72, the actuation plunger 72 actuates the actuation valve assembly 60, which is configured to allow pressurized air to travel from the pneumatic brake pressure system of the truck trailer 10, through the inlet line 70, through the pneumatic valve 62, and into the outlet line splitter 74. From the outlet line splitter 74, the pressurized air travels through the two outlet lines 76 to each of the two rotating seal assemblies 16.

As the pressurized air travels from the outlet lines 76 of the actuation valve assembly 60, it reaches the inlet lines 88 of each of the rotating seal assemblies 16. From the inlet lines 88, the pressurized air pressurizes the cylinder 90 of the pneumatic actuation mechanism 82. This pressurization forces the piston rod 92 to move out of the pneumatic actuation mechanism 82. As the piston rod 92 is moved out of the pneumatic actuation mechanism 82, the pneumatic actuation mechanism 82 is configured to move the arm 100 of the rotating seal assembly 16. Since the arm 100 is rigidly fixed to the center shaft 84, as the arm 100 is moved, the center shaft 84 rotates and moves the rotary seal 86 from the non-sealing position into the sealing position.

When the operator is ready to open the truck trailer 10, the operator can first unlock the door 34 by rotating the latch handle 55 of the banana latch 54 counter-clockwise to an unlocked position. In the unlocked position, the curved arm 56 of the banana latch 54 is rotated so that no portion of the curved arm 56 is directly below the latch bar 28. In this configuration, the latch bar 28 does not prevent the door 34 from being raised.

When the banana latch 54 is rotated into the unlocked position, the tip of the curved arm 56 comes out of contact with the flexible striker portion 80 of the actuation plate assembly 64. Since the spring-biased hinge 81 biases the actuation plate assembly 64 towards the initial position, the actuation plate assembly 64 then returns to its initial position, decompressing the actuation plunger 72.

When the actuation plunger 72 decompresses, the pneumatic valve 62 is configured to relieve the pressure accumulated in the two outlet lines 76, which in turn relieves the pressure in each of the pneumatic actuation mechanisms 82 of each of the two rotating seal assemblies 16. As the pressure is relieved in each of the pneumatic actuation mechanisms 82, the pressure in each of the cylinders 90 drops, allowing the piston rod 92 to retract into the pneumatic actuation mechanism 82. Accordingly, as the pneumatic actuation mechanism 82 is retracted, the arm 100 of the rotating seal assembly 16 is moved, so that the center shaft 84 rotates the rotary seal 86 from the sealing position into the non-sealing position.

In some embodiments, the rotating seal assemblies 16 may be biased towards the non-sealing position. This biasing may be achieved with torsional springs (not shown) applied to the center shafts 84, with linear springs (not shown) attached to the arms 100, or by using other suitable biasing means.

It will be understood that the embodiments discussed above are presented as examples only, and that other embodiments are possible. For example, in the rotating seal assemblies 16, the flexible door portion 106 contacts a rear facing surface of the door 34. In other embodiments, a rotating seal assembly 16 may be configured so that the flexible door portion 106 alternatively contacts a side edge surface of the door 34.

Thus, embodiments of the invention provide a seal assembly for providing an actuatable rotational seal between a door and a rear wall of a truck trailer. The improved seal assembly can provide improved ease of use as compared to conventional truck trailer sealing methods, and can be implemented on both dry freight and refrigerated freight truck trailers. Further, some embodiments of the improved seal assembly can be manufactured from a dual extrusion process, thereby reducing the need for secondary assembly processes.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A door sealing system for an overhead door assembly of a vehicle having a brake pressure system, the overhead door assembly including a door frame having a sill and a door panel moveable between an open position and a closed position, the door sealing system comprising:
   a rotating seal apparatus comprising:
      a rod arranged proximate an edge of the door frame;
      a first seal extending radially from the rod; and
      a second seal extending radially from the rod;
   when the door panel is in the closed position, the rod is moveable between a first position, where the first seal is spaced-apart from the door panel and the second seal is spaced-apart from the door frame, and a second position, where the first seal is engaged with the door panel and the second seal is engaged with the door frame.

2. The door sealing system of claim 1, further comprising:
   an actuation system including an actuation valve assembly connected to an actuation mechanism configured to move the rod between the first position and the second position.

3. The door sealing system of claim 2, wherein the actuation system is a pneumatic actuation system.

4. The door sealing system of claim 3, wherein the pneumatic actuation system is pneumatically powered using pressurized air from the brake pressure system of the vehicle.

5. The door sealing system of claim 2, further comprising:
   a latch assembly configured to selectively lock and unlock the door panel in the closed position; and
   when the latch assembly locks the door panel in the closed position, the latch assembly is configured to engage the actuation valve assembly of the actuation system.

6. The door sealing system of claim 5, wherein, when the latch assembly engages the actuation valve assembly, the actuation valve assembly is configured to actuate the actuation mechanism to move the rod into the second position.

7. The door sealing system of claim 6, wherein the actuation valve assembly includes an actuation plate assembly and a pneumatic valve.

8. The door sealing system of claim 7, wherein the actuation plate assembly is configured to selectively actuate the pneumatic valve and includes a striker.

9. The door sealing system of claim 8, wherein the actuation mechanism includes a cylinder and a piston rod configured to move out of and into the cylinder when the actuation mechanism is pressurized and depressurized, respectively.

10. The door sealing system of claim 9, wherein the latch assembly includes a curved arm configured to selectively engage and disengage the sill to respectively lock and unlock the door panel in the closed position.

11. The door sealing system of claim 10, wherein the rotating seal apparatus further includes an arm rigidly coupled to and extending radially outward from the rod and further coupled to an end of the piston rod of the actuation mechanism.

12. The door sealing system of claim 11, wherein, when the curved arm engages the sill, thereby locking the door panel in the closed position, the curved arm further engages the striker of the actuation plate assembly, thereby actuating the pneumatic valve such that pressurized air from the brake pressure system is applied through the actuation valve assembly to the actuation mechanism, thus forcing the piston rod to move partially out of the actuation mechanism, thereby pushing the arm and moving the rod from the first position to the second position.

13. The door sealing system of claim 1, wherein the rod is rotatable between the first position and the second position.

14. A door sealing system for an overhead door assembly of a vehicle, the overhead door assembly including a door frame having a sill and a door panel moveable between an open position and a closed position, the vehicle having a brake pressure system, the sealing system comprising:
a rotating seal apparatus including a rod, a first seal, and a second seal, the rod arranged proximate an edge of the door frame, the first seal extending radially from the rod, and the second seal extending radially from the rod;
an actuation system including an actuation valve assembly and an actuation mechanism, the actuation valve assembly connected to the brake pressure system, and the actuation mechanism connected to the actuation valve assembly and configured to move the rod between a first position, where the first seal is spaced-apart from the door panel and the second seal is spaced-apart from the door frame, and a second position, where the first seal is engaged with the door panel and the second seal is engaged with the door frame; and
a latch assembly having a curved arm configured to selectively engage and disengage the sill to respectively lock and unlock the door panel in the closed position;
wherein when the curved arm engages the sill, thereby locking the door panel in the closed position, the curved arm further engages the actuation valve assembly such that pressurized air from the brake pressure system is applied through the actuation valve assembly to the actuation mechanism, and when the pressurized air is applied to the actuation mechanism, the actuation mechanism is configured to move the rod from the first position to the second position.

15. The door sealing system of claim 14, wherein the actuation valve assembly includes an actuation plate assembly and a pneumatic valve.

16. The door sealing system of claim 15, wherein the actuation plate assembly is configured to selectively actuate the pneumatic valve and includes a striker.

17. The door sealing system of claim 16, wherein the actuation mechanism includes a cylinder and a piston rod configured to move out of and into the cylinder when the actuation mechanism is pressurized and depressurized, respectively.

18. The door sealing system of claim 17, wherein the rotating seal apparatus further includes an arm extending radially outward from the rod and coupled to an end of the piston rod of the actuation mechanism.

19. The door sealing system of claim 18, wherein, when the curved arm engages the actuation valve assembly, the curved arm further engages the striker of the actuation plate assembly, thereby actuating the pneumatic valve such that the pressurized air from the brake pressure system is applied through the actuation valve assembly to the actuation mechanism, thus forcing the piston rod to move partially out of the actuation mechanism, thereby pushing the arm and moving the rod from the first position to the second position.

20. The door sealing system of claim 14, wherein the rod is rotatable between the first position and the second position.

* * * * *